Feb. 18, 1958     L. E. ELLISON     2,824,283
CORROSION METER
Filed Dec. 31, 1956
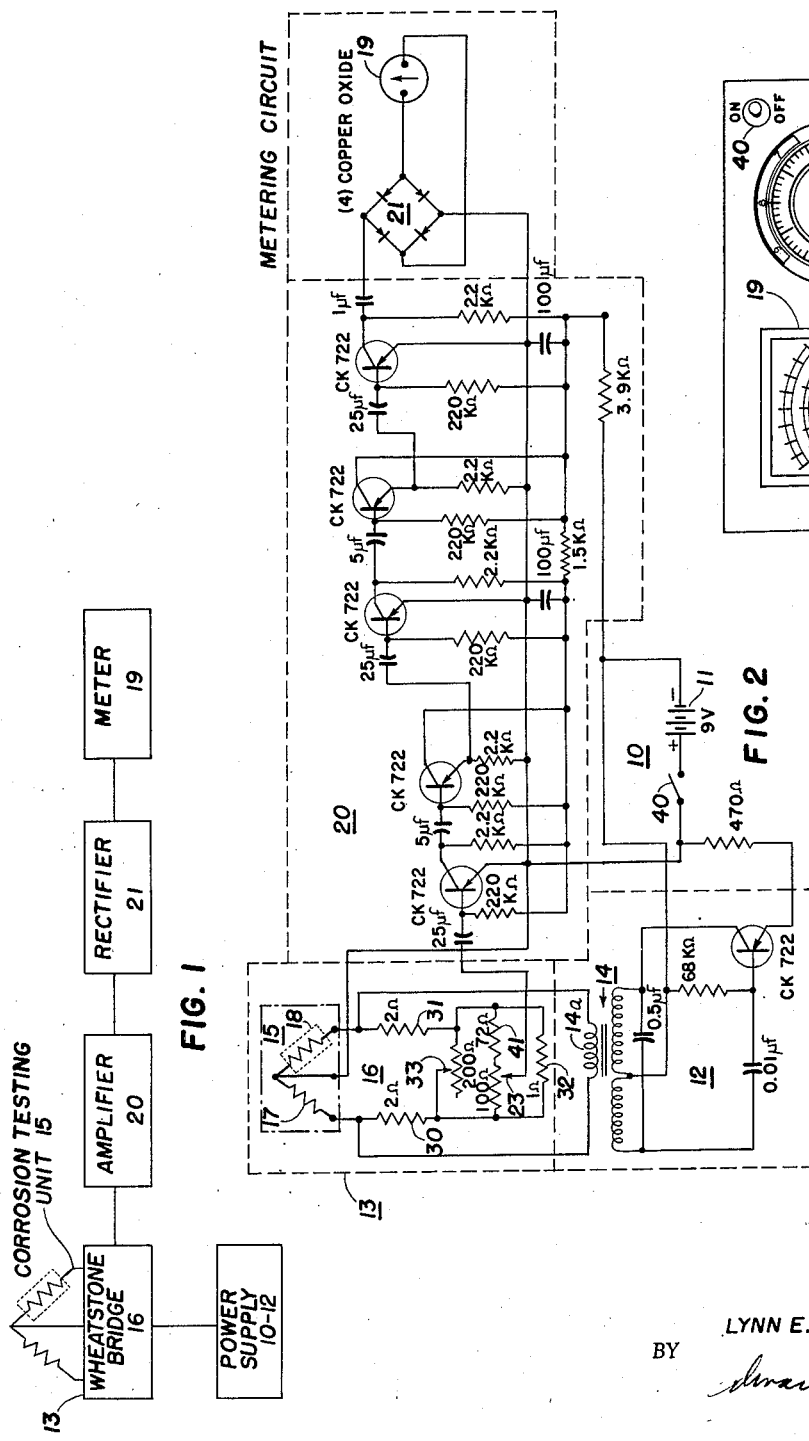
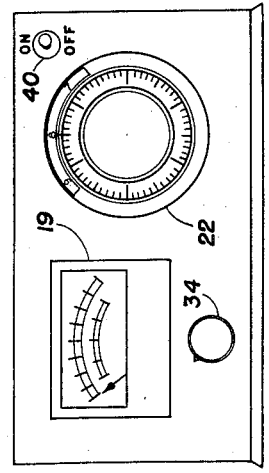
INVENTOR.
LYNN E. ELLISON
BY
ATTORNEY

United States Patent Office 2,824,283
Patented Feb. 18, 1958

2,824,283

CORROSION METER

Lynn E. Ellison, Crystal Lake, Ill., assignor to The Pure Oil Company, Chicago, Ill., a corporation of Ohio Application December 31, 1956, Serial No. 631,697

8 Claims. (Cl. 324—65)

This invention relates to an electronic device which directly and proportionally indicates changes in resistance, such as those which are produced in resistance bridge measurements.

Because of their accuracy and flexibility in making resistance measurements by means of comparison methods, resistance bridges are incorporated as the sensing element in many instruments. These instruments function as analog computers to indicate quantitatively changes in physical characteristics which could not be conveniently made by other expedients. One application of such a bridge is in corrosion studies where a corrosion-testing unit, or probe, comprising a pair of serially connected metallic, strip-like coupons which form one resistance branch of a Wheatstone bridge is exposed to a corrosive environment. Such a device is completely discussed in a U. S. patent application entitled, "Apparatus for Determining the Influence of Corrosion on Metallic Materials of Construction," Serial No. 528,032, filed August 12, 1955, by Glenn A. Marsh and Edward Schaschl. To effect a means for compensation for temperature changes, one of the coupons is insulated from the corrosive environment by means of a suitable protective coating. Suitable electrical connections are made with other resistance elements which form the other half of the Wheatstone bridge. This latter section of the bridge is placed outside the corrosive environment along with the power supply to the bridge and an appropriate electrical circuit, which functions as a null detector. Upon loss of metal due to corrosion of the unprotected specimen, small increases in resistance are produced. Because the magnitude of the changes in resistance in a corrosion-measuring probe of this nature is small, it is necessary to employ a bridge-measuring network which is sufficiently sensitive to permit their measurement. Furthermore, the diversity of installation locations which are necessary in investigating or studying the corrosion rate of extended systems such as pipe lines, petroleum refining process equipment, etc. requires a bridge-measuring apparatus which is easily carried, rugged and safe to use in hazardous locations where the use of explosion-proof equipment is required. It is therefore the primary object of this invention to provide a highly sensitive, self-contained, portable, Wheatstone-bridge-measuring circuit for detecting and measuring small changes in resistance, resulting from the dimensional change due to the corrosion of a metallic specimen, comprising a resistance element in a Wheatstone bridge. It is another object of this invention to provide a portable, Wheatstone-bridge-measuring circuit for use in connection with temperature-compensated, corrosion-test probes comprising a pair of serially connected, metallic elements forming one resistance branch of a Wheatstone bridge.

These and other objects will become apparent from the following detailed description of this invention.

Figure 1 is a block diagram of the several component circuits which cooperate to form the Wheatstone-bridge-measuring and detecting network of this invention.

Figure 2 is a schematic diagram of the Wheatstone bridge network showing the various circuit components employed in a preferred embodiment.

Figure 3 is an illustration of the control panel of an instrument housing containing the bridge-measuring and detecting network of this invention.

Referring to the drawing, it will be seen that the apparatus of this invention consists of power supply 10, which comprises a low-voltage, D. C. power source provided by suitable electrical batteries 11. This low-voltage D. C. power is converted to a low-frequency, alternating current by a suitable electrical converter 12, such as an electronic oscillator of the so-called "Hartley" type or other expedients such as a multivibrator circuit. This oscillator circuit is inductively coupled to Wheatstone bridge circuit 13 through transformer 14 employing secondary coil 14a which has an impedance which substantially matches that of corrosion-testing probe 15. The alternating current produced is impressed across the two resistance branches, 15 and 16, of Wheatstone bridge circuit 13. The first of the resistance branches 15 consists of the temperature-compensated, corrosion-testing unit or probe. This probe, which functions as the sensing element of the corrosion meter employing the Wheatstone bridge network of this invention, is preferably prepared by serially connecting a pair of metallic foil-like coupons, 17 and 18, and mounting them on a suitable specimen holder, not shown. As pointed out above, temperature-compensation is effected by coating or ensheathing one of the coupons 18 with a protective material in order to insulate it from the corrosive environment to which the corrosion-testing probe is exposed. The resistance of unprotected coupon 17 upon exposure of the probe to corrosive conditions will increase due to dimensional changes effected by the corrosion process. The second resistance branch 16 consists of a network of resistances designed to facilitate the calibration of the bridge and provide sufficient sensitivity to permit accurate corrosion rate by direct readings. This network design is an important feature of the invention as will hereinafter be seen. Connected between the intermediate junction point of resistance branch 15 and the adjustable conatct arm of potentiometer 23 in resistance branch 16 of Wheatstone bridge 13 is a suitable circuit including microammeter 19 for measuring the amplified current flowing from the Wheatstone bridge circuit resulting from an unbalancing of the bridge. The amplification of this current flow is effected by transistor-type amplifier 20 illustrated in Figure 2 to produce an output signal which is changed to direct current by means of a suitable rectifier 21. This signal is then metered by microammeter 19. Although the Wheatstone-bridge-measuring network of this invention functions primarily as a null detector, the characteristics of the resistances in resistance branch 16 are selected so that calibrated dial 22, shown in Figure 3, which controls the positioning of the sliding contact arm of potentiometer 23, serves to indicate directly appropriate corrosion dimensions, such as percent weight loss, or other similar units which are readily convertible to corrosion rate.

The objectives of this invention are attained by providing resistance branch 16 with several important characteristics. The total resistance of this branch is not greater than the input impedance of transistor-type amplifier 20. The resistance should be sufficiently low to minimize the effect of stray induction currents produced by electric motors, or other similar electrical devices, but not low enough to draw excessive amounts of current. Because portability of the instrument of this invention is an objective, fixed resistors of less than 1 ohm have accuracy limitations which make their use undesirable. Accordingly, resistance branch 16 comprises three, serially connected, fixed resistors 30, 31 and 32 which are a part of voltage-divider circuit forming resistance branch 16. Because the correlation between corrosion rate and change in resistance is substantially linear up to about a 25% incremental change in resistance of the corroding resistance element 17 in resistance branch 15 the apparatus of this invention is designed to function within this range to obtain maximum accuracy. Therefore, resistor 32 is selected so that in cooperation with resistances 30 and 31 there will be produced across resistance 32 an IR drop substantially equal to the IR drop produced across resistance element 17 when in a sufficiently corroded condition to manifest a 25% increase in resistance. Resistors 30 and 31, which are preferably substantially equal in resistance, are sized to provide this IR drop. Using only this basic resistance combination, a balancing of bridge circuit 13 could be effected; however, unsatisfactory resolution for evaluating corrosion rate would be obtained because the adjustment of a sliding contact arm along resistance 32 would be too coarse to properly reflect the small changes in resistance occurring during the corrosion of resistance element 17. To provide satisfactory resolution, precision potentiometer 23 having a high resolution is placed in parallel with fixed resistor 32. The resistance of potentiometer 23 is large enough so that small adjustments of the sliding contact arm reflect small changes in resistance commensurate with those occurring during the corrosion of resistance element 17 without exceeding the total resistance limitation imposed on resistance branch 16. The selection of potentiometer 23 will depend upon the characteristics of calibrated millidial 22 which is used to effect the movement of the sliding contact arm. Millidials which are employed in this invention are exemplified by the so called Duodials sold by the Helipot Corporation, South Pasadena, California. Suitable dials are multiple-turns-indicating devices which provide a high degree of setting accuracy. In effect, these dials consist of a set of dials, one of which will rotate a plurality of turns for a single revolution of the other. To afford proper "setability" or resolution in adjusting potentiometer 23, turns ratios of 10–40:1 are used. Each dial is appropriately calibrated so that intermediate settings can be accurately identified.

In order to calibrate the apparatus of this invention variable, calibration resistor 33 controlled by dial 34 (Figure 3) is also connected in parallel with fixed resistor 32. The value and function of resistor 33 will be made apparent from a description of the operation of the apparatus as a corrosion-rate meter.

In use, the instrument is calibrated by substituting a non-inductively wound calibration coil for the corrosion-testing unit in the bridge circuit. The calibration coil, having substantially the same resistance as testing unit 15, is interconnected in the Wheatstone bridge circuit and the power circuit energized by closing electrical switch 40. Potentiometer 23 is adjusted to register a null point on ammeter 19, i. e., a balanced bridge condition indicated by the minimum current flow through meter 19. With the proper design of bridge network 13, balancing of the bridge will occur in the lower portion of calibrated millidial 22, viz., 10–20% of the full scale reading. With bridge 13 balanced, the resistance of the calibration coil is increased by 25% and the calibrated dial is turned to an appropriate setting to approximately rebalance bridge 13. With the dial in the rebalanced position there should be a sufficient spread of dial units between the two positions of balance so that each unit of dial calibration will indicate a sufficiently small percentage change in resistance to facilitate evaluating small changes caused by corrosion. In addition the total number of units of dial calibration for rebalancing is selected so that each unit represents an aliquot proportion of resistance change readily adapted to direct reading. From this approximate balance point bridge 13 is brought into exact balance by properly adjusting variable resistor 33 by means of dial 34. Corrosion testing unit 15 is substituted for the calibration coil and bridge 13 rebalanced by appropriate adjustment of potentiometer by repositioning of calibrated dial 22. Upon exposure of corrosion testing unit 15 to a corrosive environment unprotected resistance element 17 will corrode to cause an incremental change in the resistance of element 17 to effect an electrical unbalancing of bridge circuit 15. Bridge 15 is again brought into balance by repositioning of calibrated dial 22. As pointed out above, by selecting a potentiometer having the desired characteristics, which is operated by a suitably calibrated millidial, a direct reading in terms of percent change in resistance can readily be determined which will permit converting the difference in units of calibration provided by the difference in dial 22 settings required for the initial balancing of the Wheatstone bridge and its subsequent rebalancing required by the corrosion of the unprotected resistance element of the corrosion-testing unit to more appropriate terms of corrosion rate.

In Figure 2 is shown a specific embodiment of an apparatus designed for use in cooperation with a corrosion-testing unit consisting of a pair of 3″ long, serially connected, foil-like resistance elements fabricated from 0.0001 x 0.125 inch steel shim stock. As there is a reciprocal relationship between resistance and cross-sectional area, a 25% incremental change in resistance is equivalent to a 20% decrease in average cross-sectional area, or a 10% change in average thickness on each side of the specimen. The edges of the specimen are small by comparison to the width and are neglected in this calculation. One of these elements was ensheathed in a corrosion-resistant, protective coating. In designing the bridge circuit an AJ series Helipot precision potentiometer having a 100-ohm resistance was used. This ten-turn helical slide-wire potentiometer had a resolution of 1/3000. To actuate the slide block, a model RA Duodial having a 10:1 turns ratio was employed. Accordingly, each calibration unit represented 0.001 of full scale. By positioning fixed resistor 41 in series with potentiometer 23, a balance point at about the 200 unit setting of calibrated dial 22 is obtained. This permits the bridge to be initially balanced at a positive dial reading regardless of slight differences in the resistance of the corrosion-testing units arising in their manufacture. The design of resistance branch 16 permitted the instrument to be adjusted so that 500 dial units represented a 25% change in the resistance of the unprotected resistance element. To provide the proper power supply, a battery-operated Hartley-type oscillator 12 was provided. Oscillator 12 was inductively coupled to bridge circuit 16 through transformer 14 having secondary coil 14a whose impedance matched the impedance of the corrosion-tesing unit. Impressed across bridge 13 was a 17-millivolt, 100 cycle A. C. signal. The three-stage transistor-amplifier 20 had sufficient gain to amplify the signal resulting from the unbalancing of bridge 15 and provide a signal which could be rectified and metered by means of a 0–25 microammeter 19. Although the instant invention, as illustrated in the foregoing embodiment, is specific to the design of a bridge network especially adaptable for use with the corrosion-testing units or probes described in the above-mentioned application, various modifications within the scope of this invention can be made by those skilled in this art.

In order to provide a suitable electrical battery-energized power source, particularly when it is desired to utilize primary or secondary cells having a direct current operating voltage of 6 to 12 volts to impress a low-voltage alternating current across the resistance branches of the Wheatstone bridge circuit, a converter, which will function as a stable source of low-frequency alternating current, is used. To properly energize the Wheatstone bridge circuit a 70 to 110 cycle alternating current must be provided to avoid the effect of high frequencies on the impedance characteristics of the leads connecting the corrosion-testing units to the bridge network of this invention. A preferred expedient for converting the direct current supplied by the electrical battery is the so-called "Hartley" oscillator circuit employed in the illustrative embodiment. This oscillator utilizes a tapped inductance coil to provide the necessary feed-back energy to sustain oscillation. Alternatively, transistor-type multivibrator circuits can also be employed as converters to provide the low-frequency, alternating current. (Cf. Transistors and Their Application, Louis E. Garner, Jr., Coyne Electrical School, at pages 66 and 67). Another suitable oscillator is the "Colpitts" type.

The A. C. power supplied to the bridge circuit should have sufficient voltage to provide sufficient power for the operation of the apparatus without causing thermal effects due to heating of the resistance elements of the probe by the impressed A. C. Accordingly a low voltage, viz., 15 to 25 millivolts is impressed across the bridge.

The electrical signal resulting from the electrical unbalancing of the Wheatstone bridge is transmitted to a transistorized, high-gain multi-stage audio amplifier which will provide a gain of 75-90 db. The amplifier is suitably coupled with the bridge circuit. Various coupling expedients such as capacitance, transformer, and others can be used. A complete specific embodiment of a preferred amplifier circuit is shown in Figure 3. Employed in this circuit are conventional transistors. In the specific embodiment, the circuit comprises five grounded emitter stages utilizing CK 722 Transistors. All load resistors are 2200 ohms whereas the resistors between the transistor bases and negative supply which provide the necessary bias are 220,000 ohms. Interstage coupling capacitors are 25 mfd. for the grounded-emitter inputs and 5 mfd. for the grounded-collector inputs. The values of the other circuit elements are as shown. It is to be understood, however, that these values are not critical and other equivalent arrangements can be used. To permit a microammeter to be connected to the amplifier, the output signal is converted by means of a conventional bridge-type, dry rectifier employing, for example, Conant Model M copper oxide diodes, manufactured by Conant Electrical Laboratories, Lincoln, Nebraska. Other equivalent crystals such selenium oxide, germanium, etc., can also be used.

The instrument of this invention is particularly and especially adaptable for use as a null detector and corrosion-rate meter in combination with the temperature-compensated, corrosion-testing unit hereinbefore described. In addition to its feature of portability, the instrument is extremely sensitive and accurate, having an accuracy of 0.5 microinch or better. Being based on the principle of null balancing, the efficiency of the instrument is not influenced by variations in power input. It has also been found that a wide variety of corrosion-testing unit designs with resistance elements of varying thicknesses can be used without varying the Wheatstone bridge input current. It is preferred, however, that a maximum thickness of about 10 mils (0.010") be used in fabricating the resistance elements of the corrosion-testing unit employed in combination with the apparatus of this invention.

I claim:

1. In a corrosion meter for measuring the corrosion rate of a corrosion-testing unit comprising a first, temperature-compensated, resistance element serially connected to a second, corrosion-susceptible, strip-like, resistance element having the same composition as said first element, and three electrical conductors consisting of first and second electrical conductors respectively connected to the terminal ends of said resistance elements and a third conductor connected to the intermediate junction between said resistance elements, thereby forming a first resistance branch of an electrical bridge, an electronic network consisting of a second resistance branch of an electrical bridge; means for cooperating with said conductors whereby said first resistance branch can be connected in parallel with said second resistance branch forming an electrical bridge; a power source of 70-110 cycle alternating current, energized by an electrical battery, inductively coupled to said second resistance branch to supply sufficient voltage to energize said bridge; a transistorized amplifier having a 75-90 decibel gain, electrically coupled between said resistance branches to amplify any electrical signal produced by the electrical unbalancing of said bridge; and a metering circuit consisting of a full-wave rectifier for converting the output signal from said amplifier to direct current, and an electrical meter for making visibly manifest the direct current flow, said second resistance branch having a total resistance of less than the impedance input of said amplifier and comprising first and second resistors having a third resistor serially connected intermediate thereto whereby the voltage drop across said third resistor at electrical balance of said bridge is substantially the same as the voltage drop across said first, corrosion-susceptible, resistance element of the corrosion-testing unit when the resistance of said element is increased by about 25%, a precision potentiometer having high resolution connected in parallel across said third resistor whereby fine adjustments can be made to effect the electrical balance of said electrical bridge, a multiturn millidial for adjusting said potentiometer, and a calibrating, variable resistor connected in parallel across said third resistor.

2. In a corrosion meter for measuring the corrosion rate of a corrosion-testing unit comprising a first, temperature compensated, resistance element serially connected to a second, corrosion-susceptible, strip-like, resistance element having the same composition as said first element, and three electrical conductors consisting of first and second electrical conductors respectively connected to the terminal ends of said resistance elements and a third conductor connected to the intermediate junction between said resistance elements, thereby forming a first resistance branch of an electrical bridge; an electronic network consisting of a second resistance branch of an electrical bridge; means for cooperating with said conductors whereby said first resistance branch can be connected in parallel with said second resistance branch forming an electrical bridge; a power source of 70-110 cycle alternating current, energized by an electrical battery, inductively coupled to said second resistance branch to supply sufficient voltage to energize said bridge; said power source comprising an oscillator circuit consisting of a transistor having base, emitter, and collector elements, a primary inductance coil having an intermediate tap, a first capacitance means serially connected between said transistor base and inductance coil, a second capacitance means connected in parallel across said inductance coil, an electrical cell serially connected between the tap of said primary coil and the emitter, a resistor serially connected between the transistor base and said tap, whereby the frequency of said power source is determined by the cooperation of the inductive reactance of the primary inductance coil and the second capacitance connected in parallel with said inductance coil, and a secondary coil inductively cooperating with said primary coil, the impedance of said secondary coil being substantially the same as the resistance of said corrosion-testing unit; a transistorized amplifier having at least a 75-90 decibel gain electrically coupled between said resistance branches to amplify any electrical signal produced by the electrical unbalancing of said bridge; and a metering circuit consisting of a full-wave rectifier for converting the output signal from said amplifier to direct current, and an electrical meter for making visibly manifest the direct current flow, said second resistance branch having a total resistance of less than the impedance input of said amplifier and comprising first and second resistors having a third resistor serially connected intermediate thereto whereby the voltage drop across said third resistor at electrical balance of said bridge is substantially the same as the voltage drop across the first, corrosion-susceptible, resistance element of the corrosion testing unit, when the resistance of said element is increased by about 25%, a precision potentiometer having high resolution connected in parallel across said third resistor whereby fine adjustments can be made to effect the electrical balance of said electrical bridge, a multiturn millidial for adjusting said potentiometer, and a calibrating, variable resistor connected in parallel across said third resistor.

3. In a corrosion meter for measuring the corrosion rate of a corrosion-testing unit comprising a first, temperature-compensated, resistance element serially connected to a second, corrosion-susceptible, strip-like, resistance element having the same composition as said first element, and three electrical conductors consisting of first and second electrical conductors respectively connected to the terminal ends of said resistance elements and a third conductor connected to the intermediate junction between said resistance elements, thereby forming a first resistance branch of an electrical bridge; an electronic network consisting of a second resistance branch of an electrical bridge; means for cooperating with said conductors whereby said first resistance branch can be connected in parallel with said second resistance branch forming an electrical bridge; a power source of 70–110 cycle alternating current, energized by an electrical battery, inductively coupled to said second resistance branch to supply sufficient voltage to energize said bridge, said power source comprising an oscillator circuit consisting of a transistor having base, emitter, and collector elements, a primary inductance coil having an intermediate tap, a first capacitance means serially connected between said transistor base and collector, a second capacitance means connected in parallel across said inductance coil, an electrical cell serially connected between the tap of said primary coil and the emitter, a resistor serially connected between the transistor base and said tap, whereby the frequency of said power source is determined by the cooperation of the inductive reactance of the primary inductance coil and the second capacitance connected in parallel with said inductance coil, and a secondary coil inductively cooperating with said primary coil, the resistance of said secondary coil being substantially the same as the resistance or said corrosion-testing unit; a transistorized amplifier having at least a 75–90 decibel gain, electrically coupled between said resistance branches to amplify any electrical signal produced by the electrical unbalancing of said bridge; a metering circuit coupled to said amplifier and consisting of a full-wave bridge rectifier comprising four semiconductor crystal diodes and a microammeter connected between two branches of said rectifier, whereby the output signal of said amplifier can be converted to direct current and made visibly manifest, said second resistance branch having a total resistance of less than the impedance input of said amplifier and comprising first and second resistors having a third resistor serially connected intermediate thereto whereby the voltage drop across said third resistor at electrical balance of said bridge is substantially the same as the voltage drop across said first, corrosion-susceptible, resistance element of the corrosion-testing unit when the resistance of said element is increased by about 25%, a precision potentiometer having high resolution connected in parallel across said third resistor whereby fine adjustments can be made to effect the electrical balance of said electrical bridge, a multiturn millidial for adjusting said potentiometer, and a calibrating variable resistor connected in parallel across third resistor.

4. A network in accordance with claim 3 in which said diodes are copper oxide.

5. In a corrosion meter for measuring the corrosion rate of a corrosion-testing unit comprising a first, temperature-compensated, resistance element serially connected to a second, corrosion-susceptible, strip-like, resistance element having the same composition as said first element, and three electrical conductors consisting of first and second electrical conductors respectively connected to the terminal ends of said resistance elements and a third conductor connected to the intermediate junction between said resistance elements, thereby forming a first resistance branch of an electrical bridge; an electronic network consisting of a second resistance branch of an electrical bridge; means for cooperating with said conductors whereby said first resistance branch can be connected in parallel with said second resistance branch forming an electrical bridge; a power source of 70–110 cycle alternating current, energized by an electrical battery, inductively coupled to said second resistance branch to supply sufficient voltage to energize said bridge, said power source comprising an oscillator circuit consisting of a transistor having base, emitter, and collector elements, a primary inductance coil having an intermediate tap, a first capacitance means serially connected between said transistor base and the intermediate tap of said inductance coil, a second capacitance means connected in parallel across said inductance coil, an electrical cell serially connected between the tap of said primary inductance coil and the emitter, a resistor serially connected between the transistor base and said intermediate tap, whereby the frequency of said power source is determined by the cooperation of the inductive reactance of the primary inductance coil and the second capacitance connected in parallel with said inductance coil, and a secondary coil inductively cooperating with said primary coil, the impedance of said secondary coil being substantially the same as the resistance of said corrosion testing unit; a transistorized amplifier having at least a 75–90 decibel gain electrically coupled between said resistance branches to amplify any electrical signal produced by the electrical unbalancing of said bridge; a metering circuit coupled to said amplifier and consisting of a full-wave bridge rectifier comprising four semiconductor crystal diodes and a microammeter connected between two branches of said rectifier, whereby the output signal of said amplifier can be converted to direct current and made visibly manifest, said second resistance branch having a total resistance of less than the impedance input of said amplifier and comprising first and second resistors having a fixed resistor serially connected intermediate thereto whereby the voltage drop across said fixed resistor at electrical balance is substantially the same as the voltage drop across the corrosion susceptible resistance element of the corrosion testing unit when the resistance of said element is increased by about 25%, a precision potentiometer having high resolution connected in parallel with said fixed resistor, said potentiometer having a substantially greater resistance than said fixed resistor whereby a substantial adjustment of the potentiometer reflects only a small change in the magnitude of the electrical bridge signal voltage output, a calibrated, multiturn millidial mechanically connected to said potentiometer for the adjustment thereof, and a calibrating, variable resistance connected in parallel with said fixed resistor, said variable resistance and potentiometer cooperating to permit each unit graduation of the millidial to be correlated with a convenient unit of percentage change in resistance of said corrosion susceptible element.

6. In a corrosion meter for measuring the corrosion rate of a corrosion testing unit comprising a first, temperature-compensated, resistance element serially connected to a second, corrosion-susceptible, strip-like, resistance element having the same composition as said first element, and three electrical conductors consisting of first and second electrical conductors respectively connected to the terminal ends of said resistance elements and a third conductor connected to the intermediate junction between said resistance elements, thereby forming a first resistance branch of an electrical bridge, an electronic network consisting of a second resistance branch of an electrical bridge; means for cooperating with said conductors whereby said first resistance branch can be connected in parallel with said second resistance branch forming an electrical bridge; a power source of 70–110 cycle alternating current, energized by an electrical battery, inductively coupled to said second resistance branch to supply sufficient voltage to energize said bridge, said power source comprising an oscillator circuit consisting of a transistor having base, emitter, and collector elements, a primary inductance coil having an intermediate tap, a first oscillator capacitance means serial connected between said transistor base and collector, a second capacitance means connected in parallel across said inductance coil, an electrical cell serially connected between the tap of said primary coil and the emitter, resistor serially connected between the transistor base and said tap whereby the frequency of said power source is determined by the cooperation of the inductive reactance of the primary inductance coil and the second capacitance connected in parallel with said inductance coil, and a secondary coil inductively cooperating with said primary coil, the impedance of said secondary coil being substantially the same as the resistance of said corrosion testing unit; a transistorized amplifier having at least a 75–90 decibel gain electrically coupled between said resistance branches to amplify any electrical signal produced by the electrical unbalancing of said bridge; a metering circuit coupled to said amplifier and consisting of a full wave bridge rectifier comprising four semiconductor crystal diodes, and a microammeter connected between the two branches of said rectifier whereby the output signal of said amplifier can be converted to direct current and made visibly manifest; said second resistance branch having a total resistance of less than the impedance input of said amplifier and comprising first and second resistors having a fixed resistor serially connected intermediate thereto whereby the voltage drop across said fixed resistor at electrical balance is substantially the same as the voltage drop across the corrosion susceptible resistance element of the corrosion testing unit when the resistance of said element is increased by about 25%, a precision potentiometer having high resolution connected in parallel with said fixed resistor said potentiometer having a substantially greater resistance than said fixed resistor whereby a substantial adjustment of the potentiometer reflects only a small change in the magnitude of the electrical bridge signal voltage output, a 10:1 turns ratio calibrated, multiturn millidial connected to said potentiometer for the adjustment thereof and, a calibrating, variable resistance connected in parallel with said fixed resistor, said variable resistance and potentiometer cooperating to permit each unit graduation of the millidial to be correlated with a convenient unit of percentage change in resistance of said corrosion susceptible element.

7. A network in accordance with claim 6 where in the second resistance branch said calibrating, variable resistance and potentiometer cooperate to provide a 25% change in the resistance of the corrosion-susceptible to be reflected in 50% of the full scale of the millidial.

8. In a corrosion meter for measuring the corrosion rate of a corrosion testing unit comprising a first, temperature-compensated, resistance element serially connected to a second, corrosion-susceptible, strip-like, resistance element having the same composion as said first element, and three electrical conductors consisting of first and second electrical conductors respectively connected to the terminal ends of said resistance elements and a third conductor connected to the intermediate junction between said resistance elements, thereby forming a first resistance branch of an electrical bridge, an electronic network consisting of a second resistance branch of an electrical bridge; means for cooperating with said conductors whereby said first resistance branch can be connected in parallel with said second resistance branch forming an electrical bridge; a power source of 70–110 cycle alternating current, energized by an electrical battery, inductively coupled to said second resistance branch to supply sufficient voltage to energize said bridge; said power source comprising an oscillator circuit consisting of a transistor having base, emitter, and collector elements, a primary inductance coil having an intermediate tap, a first capacitance means serially connected between said transistor base and collector, a second capacitance means connected in parallel across said inductance coil, an electrical cell serially connected between the tap of said primary coil and the emitter, a resistor serially connected between the transistor base and said tap whereby the frequency of said power source is determined by the cooperation of the inductive reactance of the primary inductance coil and the second capacitance connected in parallel with said inductance coil, and a secondary coil inductively cooperating with said primary coil, the impedance of said secondary coil being substantially the same as the resistance of said corrosion testing unit; a transistorized amplifier having at least a 75–90 decibel gain, electrically coupled between said resistance branches to amplify any electrical signal produced by the electrical unbalancing of said bridge; a metering circuit coupled to said amplifier and consisting of a full wave bridge rectifier comprised by four semiconductor crystal diodes and a microammeter connected between the two branches of said rectifier, whereby the output signal of said amplifier can be converted to direct current and made visibly manifest, said second resistance branch having a total resistance of less than the impedance input of said amplifier and comprising first and second fixed resistors having a third fixed resistor serially connected intermediate thereto whereby the voltage drop across said third fixed resistor at electrical balance is substantially the same as the voltage drop across the corrosion susceptible resistance element of the corrosion testing unit when the resistance of said element is increased by about 25%, a fourth fixed resistor serial connected to a precision potentiometer having high resolution, said fourth fixed resistor and potentiometer connected in parallel with said third fixed resistor, said potentiometer having a substantially greater resistance than said third fixed resistor whereby a substantial adjustment of the potentiometer reflects only a small change in the magnitude of the electrical bridge signal voltage output, a 10:1 turns ratio calibrated, multiturn millidial connected to said potentiometer for the adjustment thereof and, a calibrating, variable resistance connected in parallel with said third fixed resistor, said variable resistance and potentiometer cooperating to permit each unit graduation of the millidial to be correlated with a convenient unit of percentage change in resistance of said corrosion susceptible element and permit an initial electrical balance of said electrical bridge to be made in the 10–20% section of the calibrated dial.

No references cited.